United States Patent
Munoz et al.

(10) Patent No.: US 11,172,779 B1
(45) Date of Patent: Nov. 16, 2021

(54) AUTOMATIC WATERING SYSTEM

(71) Applicants: Daniel Ricardo Munoz, Lake Forest, IL (US); Kimmarie Laura Munoz, Lake Forest, IL (US); Lukas Arthur Munoz, Lake Forest, IL (US); Nina Marie Munoz, Chicago, IL (US); Alexander Daniel Munoz, San Francisco, CA (US)

(72) Inventors: Daniel Ricardo Munoz, Lake Forest, IL (US); Kimmarie Laura Munoz, Lake Forest, IL (US); Lukas Arthur Munoz, Lake Forest, IL (US); Nina Marie Munoz, Chicago, IL (US); Alexander Daniel Munoz, San Francisco, CA (US)

(73) Assignee: Glad Tidings Innovations, LLC, Deerfield, IL (US)

( * ) Notice: Subject to any disclaimer, the term of this patent is extended or adjusted under 35 U.S.C. 154(b) by 392 days.

(21) Appl. No.: 15/997,951

(22) Filed: Jun. 5, 2018

Related U.S. Application Data

(60) Provisional application No. 62/603,551, filed on Jun. 5, 2017.

(51) Int. Cl.
   *A47G 33/12* (2006.01)
   *A01G 27/00* (2006.01)

(52) U.S. Cl.
   CPC ............ *A47G 33/12* (2013.01); *A01G 27/001* (2013.01); *A01G 27/003* (2013.01); *A01G 27/005* (2013.01); *A47G 2033/1293* (2013.01)

(58) Field of Classification Search
   CPC ............ A47G 33/12; A47G 2033/1286; A47G 2033/1293; A01G 27/00; A01G 27/003;
   (Continued)

(56) References Cited

U.S. PATENT DOCUMENTS

| 3,909,948 A | 10/1975 | Markfelt |
| 4,825,587 A * | 5/1989 | Stancil .................. A47G 33/12 47/40.5 |

(Continued)

FOREIGN PATENT DOCUMENTS

| EP | 0958737 A1 * | 11/1999 | ............ A01G 27/005 |
| WO | WO-2017180111 A1 * | 10/2017 | ............ A01G 27/005 |

OTHER PUBLICATIONS

Level Sensor; Wikipedia; https://en.wikipedia.org/wiki/Level_sensor; Date: Downloaded from the Internet May 10, 2018.

(Continued)

*Primary Examiner* — Lisa L Tsang
(74) *Attorney, Agent, or Firm* — Jansson Munger McKinley & Kirby Ltd.

(57) ABSTRACT

Automatic watering systems for hydrating a cut tree or the like from a reservoir of standing water are described herein. Automatic watering systems may include a water source comprising a tank and a supply-water reservoir within the tank. Water may be automatically delivered from the supply-water reservoir to a tree-receiving reservoir which may be associated with a tree stand. Water in the tree-receiving reservoir may be taken up by the tree to keep the tree branches green and supple. A controller detects water levels in the supply-water reservoir and tree-receiving reservoir to control operation of a pump which pumps water to the tree-receiving reservoir for continuous tree hydration. The tank and other components of the system can be made to have the decorative appearance of a gift package to enhance the appearance of the tree and surrounding decor.

17 Claims, 8 Drawing Sheets

(58) Field of Classification Search
CPC ... A01G 27/005; A01G 27/008; A01G 27/001
USPC ............................................... 47/40.5
See application file for complete search history.

(56) References Cited

U.S. PATENT DOCUMENTS

| | | | | |
|---|---|---|---|---|
| 4,930,252 | A  * | 6/1990 | Krause | A47G 33/12 |
| | | | | 47/40.5 |
| 5,157,868 | A  * | 10/1992 | Munoz | A01G 27/005 |
| | | | | 47/40.5 |
| 6,497,071 | B1 * | 12/2002 | Main | A01G 27/005 |
| | | | | 47/40.5 |
| 7,222,454 | B1 * | 5/2007 | Chen | A01G 27/003 |
| | | | | 47/48.5 |
| 7,681,354 | B2 * | 3/2010 | Shepardson | A01G 27/005 |
| | | | | 47/40.5 |
| 10,631,478 | B2 * | 4/2020 | Moran | A01G 27/003 |
| 2011/0214345 | A1 * | 9/2011 | Rasschaert | A47G 33/12 |
| | | | | 47/40.5 |
| 2015/0237814 | A1 | 8/2015 | Moran | |
| 2015/0373932 | A1 * | 12/2015 | Lame | A01G 9/033 |
| | | | | 210/335 |
| 2018/0035626 | A1 * | 2/2018 | Bailey | A01G 31/06 |

OTHER PUBLICATIONS

Build This Simple Electronic Water Level Controller; Bright Hub Engineering; https://www.brighthubengineering.com/consumer-appliances-electr; Date: Downloaded from the Internet May 22, 2018.
Auto-Stop Watering System; The Christmas Tree Storage Shop; https://www.christmastreestoragebag.net/Auto_Stop_Tree_Watering_System_p/ws02.htm; The Holiday Aisle; https://www.santassolution.com/product-page/watering-system#! and https://www.wayfair.com/holiday-decor/pdx/the-holiday-aisle-auto-stop-watering-system-thla5677.html; Date: Product information available for Internet download Jan. 1, 2018.
Tree Nanny Watering System; LandMarc Products; https://landmarcproducts.com/; Date: Product information available for Internet download Jan. 1, 2018.
Tree Funnel; Jack Post: https://www.acehardware.com/departments/home-and-decor/holiday/christmas-tree-stands/9237215?x429=true&msclkid=5d9fe61cf69d1401f24cbb7b06943404&utm_source=bing&utm_medium=cpc&utm_campaign=Shopping%20-%20Pet%20Supplies&utm_term=4581802394556167&utm_content=Collars%20%26%20Leashes&gclid=COaH6rizqOQCFcODgQod3jgHmQ, Date: Product information available for Internet download Jan. 1, 2018.
Santa s Secret Gift—Christmas Tree Waterer; Santas Secret; https://www.amazon.com/Santas-Secret-Gift-Christmas-Original/dp/B00QXLRGTI/ref=sr_1_2?hvadid=78202863400025&hvbmt-bb&hvdev-c&hvqmt=b&keywords=santa%27s+secret+tree+waterer&qid=1567092965&s=gateway&sr=8-2; Date: Product information available for Internet download Jan. 1, 2018.
Ever-Green 130008 Christmas Tree Watering System; Home Products and More; https://www.homeproductsnmore.com/Christmas_Tree_Waterer_p/100008b.htm; Date: Product information available for Internet download Jan. 1, 2018.
Elf Logic—Automatic Christmas Tree Watering System; https://www.amazon.com/Elf-Logic-Automated-Christmas-Automatically/dp/B07J2TVGPX; Date: Product information available for Internet download Jan. 1, 2018.
Yardeen Micro Automanc Drip Irrigation System; https://www.amazon.com/Yardeen-Automatic-Irrigation-Sprinkler-Controller/dp/B01J9FXCS8/ref=asc_df_B01J9FXCS8/?tag=bingshoppinga-20&linkCode=df0&hvadid={creative}&hvpos={adposition}&hvnetw=o&hvrand={random}&hvpone=&hvptwo=&hvqmt=e&hvdev=c&hvdvcmdl={devicemodel}&hvlocint=&hvlocphy=&hvtargid=pla-4583451662956981&psc=1; Date: Product information available for Internet download Feb. 7, 2018.
Aquaplumb Water Level Sensors; Vegetronix; https://www.vegetronix.com/Products/AquaPlumb/; Date: Downloaded from the Internet May 10, 2018.
2X RobotDyn Water Level Sensor; https://www.ebay.com/itm/2x-RobotDyn-Water-Level-Sensor-Depth-o; Date Download from the Internet May 10, 2018.
A Dozen Ways To Measure Fluid Level and How They Work; Sensors Magazine; https://www.sensorsmag.com/components/a-dozen-ways-to-measure-f; Date: Dec. 1, 2004.
Gems Sensors and Controls; UCL-510 Ultrasonic Water Level Sensor, https://www.gemssensors.com/customersupport/literature-pdfs/ope; Date: Downloaded from the Internet May 10, 2018.

* cited by examiner

AUTOMATIC WATERING SYSTEM

RELATED APPLICATION

This application claims the benefit of U.S. Provisional Patent Application Ser. No. 62/603,551 filed Jun. 5, 2017. The entire content of U.S. Provisional Patent Application Ser. No. 62/603,551 is incorporated herein for continuity of disclosure.

FIELD

The field relates to watering systems and, more particularly, to automatic watering systems providing a reservoir of standing water for cut trees and the like.

BACKGROUND

Cut trees, such as coniferous Christmas trees, are frequently set in a water-holding reservoir which, when filled with standing water, provides water for uptake by the tree. For instance, a cut Christmas tree will typically be supported in an upright position by a tree stand which includes both a base for supporting the tree on a floor or other surface and a water-holding reservoir. Water may be poured into the reservoir to provide a source of standing water for the cut tree. The standing water in the reservoir can be taken up through the cut trunk of the tree.

A disadvantage of standing water hydration systems is that the water-holding reservoir can frequently run dry of water. Water depletion can occur when water is taken up by the tree or through water loss by evaporation. It can be inconvenient for the user to replenish the reservoir with water because low-hanging tree branches, gift packages under the tree, and other obstacles can make it difficult to pour water into the reservoir of the tree stand. If the reservoir is not frequently replenished with water, the tree branches and needles can become brittle, discolored, and can fall off. An insufficiently hydrated tree will die prematurely.

Various systems for hydrating cut trees exist, but they have certain important limitations and disadvantages. For example, pour-through type watering systems exist which consist essentially of an elongate funnel or a tube used to channel water into the reservoir of the tree stand. These types of systems are disadvantageous, however, because they require a user to first notice that water in the reservoir is low and needs replenishment. Failure to notice that the water is low, will eventually result in loss of hydration. Then, the user must manually pour water into the reservoir while avoiding overfilling the reservoir. This manual replenishment process may be inconvenient to some users and can cause water damage to the floor and anything nearby if the reservoir is overfilled.

Drip-type and siphon-type watering devices exist but these are passive devices which rely on gravity or water tension to deliver water to the reservoir. Drip type systems are limited to placement at a position above the tree stand reservoir and siphon-type systems can undesirably stop water delivery if the siphon effect is interrupted for any reason.

It would be an advance in the art to provide an improved automatic watering system capable of providing a reliable source of standing water, which would provide the standing water automatically, which would be easy to replenish with water, which would be easy to use, and which would ensure that the cut tree taking up the standing water is always hydrated.

SUMMARY

Automatic watering systems for hydrating a cut tree or like plant material from a tree-receiving reservoir in which standing water can be received are described herein. The tree-receiving reservoir may be associated with a tree stand used to hold the tree in an upright position. In embodiments, the system may comprise a tank defining a supply-water reservoir, a pump for pumping water from the supply-water reservoir to the tree-receiving reservoir, a first water-level sensor associated with the tank, a water-delivery conduit through which the pump delivers water from the supply-water reservoir to the tree-receiving reservoir, a second water-level sensor associated with the tree-receiving reservoir, and a controller for the system.

In embodiments, the tank may be a three-dimensional container with walls defining any desired configuration, such as a rectangular configuration. Other examples of configurations of the tank may include a cube and a cylinder. The tank may define a water-receiving opening which may be a port in a top wall. A removable cap may be provided to cover the port.

Gift package structure may be implemented to provide the tank with the appearance of a gift package. Providing the tank with the appearance of a gift package enables the tank component of the system to blend in with other gift packages and décor which may be arranged below or around the tree. In embodiments, the gift package structure may include an enclosure around the tank and the enclosure may include indicia providing the appearance of a gift package. The indicia of the enclosure may provide any decorative appearance, including the appearance of gift wrapping, a ribbon, a bow, and combinations of these and other types of design elements. In other embodiments, the gift package structure may include decorative sheet material, such as wrapping paper or film, a ribbon, a bow, and combinations thereof providing the appearance of the gift package.

In embodiments, the pump may be located in the tank. The pump may have a water inlet in communication with the supply-water reservoir of the tank and a water outlet.

The water-delivery conduit may have a first end in communication with the pump water outlet and a second end which is led to, and is in communication with, the tree-receiving reservoir to deliver water to the tree-receiving reservoir from the supply-water reservoir. The conduit may be a flexible elongate tube which would desirably make it easier for the user to lead the tube from the pump and tank and to the tree stand in which the tree-receiving reservoir may be located.

The first water-level sensor associated with the tank may be a float switch. Such a float switch is useful to communicate information about whether water in the tank and supply-water reservoir is above a minimum level needed to properly operate the pump.

The second water-level sensor for association with the tree-receiving reservoir may be a conductive sensor. Such a conductive sensor may communicate information about the water level in the tree-receiving reservoir when water touches, or does not touch the sensor. One type of conductive sensor may include a pair of conductive probes. In embodiments, one probe may be longer than the other. In such embodiments, the shorter probe may define the location of the maximum water level in the tree-receiving reservoir. In embodiments, contact by water with both the short and long probes may be used to communicate information indicating that water is at the maximum water level so that further water should not be added, whereas water contact with neither of the probes, or just the longer probe, may be used to communicate information indicating that water is below the maximum water level and that more water needs to be added.

The controller may provide overall control of the automatic watering system embodiments. The controller may be a microcontroller which is operatively connected to the first and second water-level sensors and pump. The controller may enable pump operation when the first water-level sensor detects that water in the supply-water reservoir of the tank is above the minimum water level. If the pump is enabled, the controller may then start the pump if standing water in the tree-receiving reservoir is below the maximum water level. And, the controller may stop the pump when standing water in the tree-receiving reservoir is at the maximum water level. In this manner, supply water from the supply-water reservoir may be delivered to the tree-receiving reservoir, thereby providing standing water for hydration of the tree while preventing overflow of the tree-receiving reservoir. This process can continue until water in the supply-water reservoir is detected to be below the minimum water level by the first water-level sensor of the embodiments. A user may then conveniently refill the tank with water.

Automatic watering system embodiments of the types described herein may include other features. For example, an alarm may be provided which is operative to indicate that water in the supply-water reservoir of the tank is below the minimum water level. The alarm may be a light alarm, an audible alarm, and combinations of these types of alarms. A switch enabling selection of one or both of these alarms may be provided.

By way of further example, in certain embodiments, the conduit or tube may include structure to prevent water overflow in the tree-receiving reservoir which could occur by means of a water-siphon effect in which water continues to flow even after the pump is turned off. In such embodiments, the conduit or tube may have vent structure. The vent structure may be in a portion of the conduit or tube within the tank above the water level. Such conduit or tube portion may include a vent opening therein which may be in the form of a small hole in the conduit or tube. The vent enables air to enter the conduit or tube when the pump is not running to stop any water-siphon effect.

Other aspects and examples of the automatic watering system and invention are described in the disclosure which follows.

BRIEF DESCRIPTION OF THE DRAWINGS

Exemplary automatic watering systems may be understood by reference to the following description taken in conjunction with the accompanying drawings, in which like reference numerals identify like elements throughout the different views. The drawings are not necessarily to scale, emphasis instead being placed upon illustrating the principles of the invention. The drawings depict only embodiments of the invention and are not therefore to be considered as limiting the scope of the invention. In the accompanying drawings.

DETAILED DESCRIPTION

Figure 1:
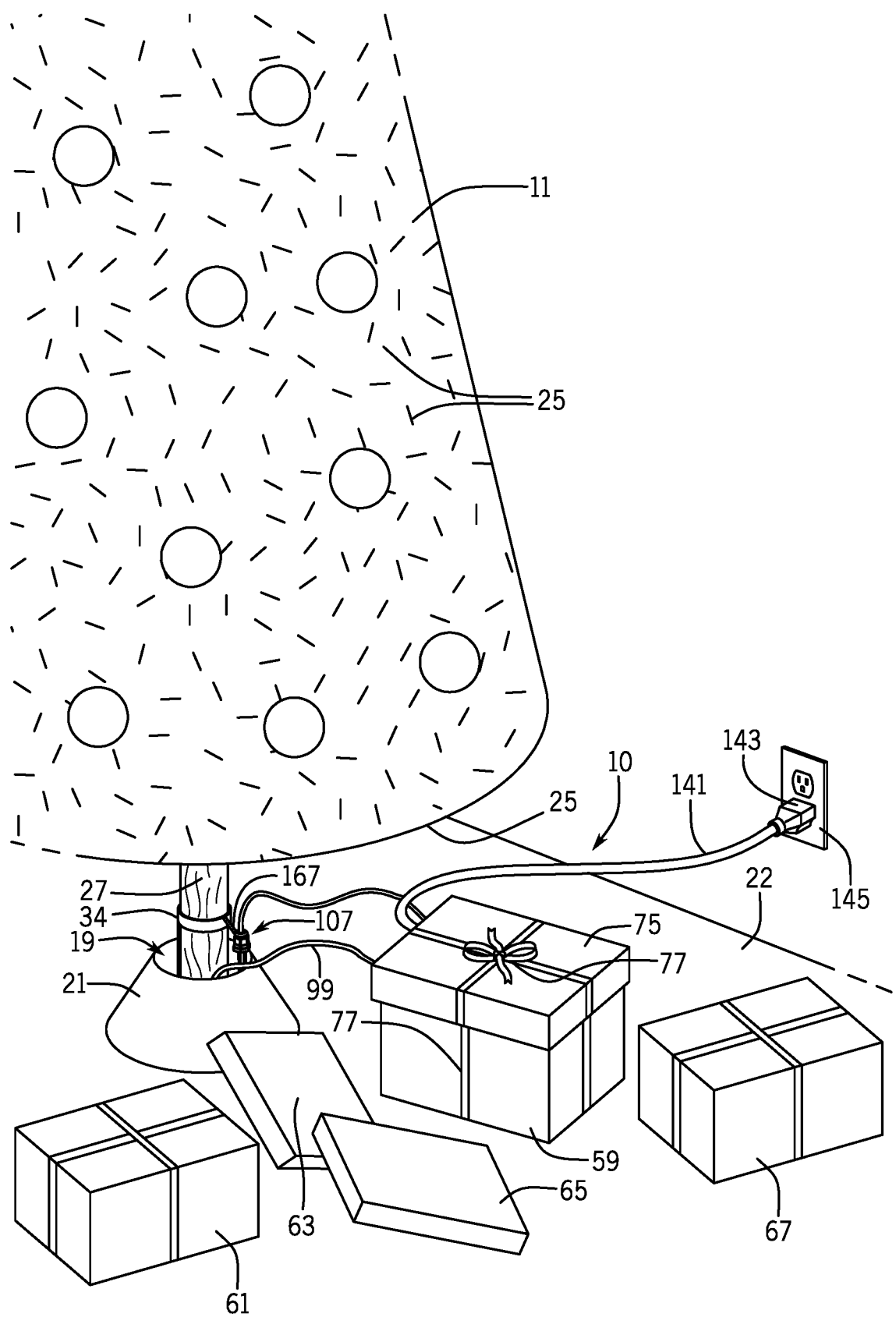
FIG. 1 is a perspective view of an embodiment of an automatic watering system illustrated in combination with a cut tree and tree stand.
Figure 2:
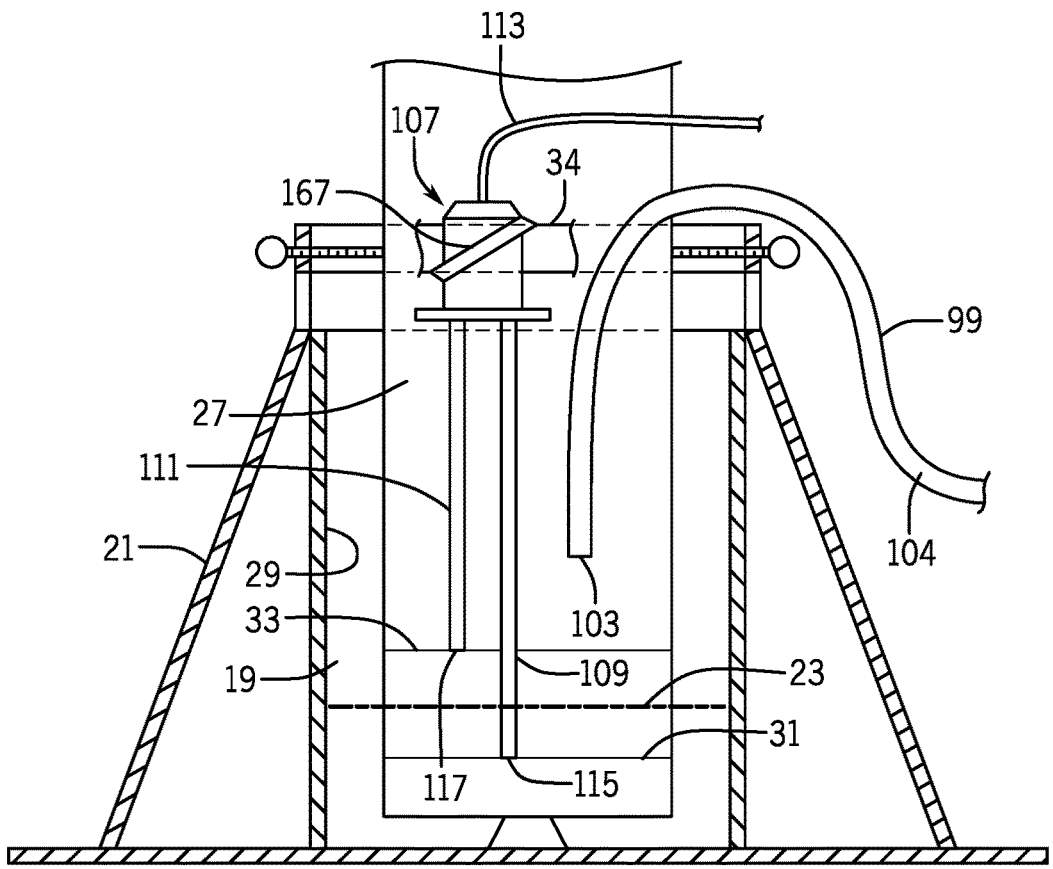
FIG. 2 is an enlarged view of the tree stand of FIG. 1 with certain components in phantom line.

Referring to FIGS. 1-12, embodiments of an exemplary automatic watering system 10 are shown. The illustrated automatic watering system 10 may be utilized for hydrating a cut tree 11, such as the coniferous Christmas tree shown in FIG. 1. In the examples, the water for hydrating tree 11 may be provided from a water source comprising a tank 13, supply-water reservoir 15 within tank 13, and water 17 from within supply-water reservoir 15. "Reservoir" as used herein means or refers to a receptacle or part of a device designed to hold fluid. In the examples of the automatic watering system 10, the fluid is water. Water 17 may be automatically delivered from tank 13 to a tree-receiving reservoir 19 which may be associated with tree stand 21. Tree stand 21 may be of a type used during the holiday season to support a cut Christmas tree 11 on floor 22. Standing water 23 in tree-receiving reservoir 19 may be taken up by tree 11 to keep tree branches 25 green and supple. A cut tree 11 is one in which trunk 27 has been cut with a saw or the like. Water is drawn up through trunk 27 to branches 25.

In the examples, tree 11 is mounted upright in tree stand 21. Wall 29 of tree stand 21 defines tree-receiving reservoir 19 and the cut end of trunk 27 rests within wall 29 and tree-receiving reservoir 19 with the cut end of trunk 27 at least below a low water level 31 needed to keep water 23 in contact with trunk 27. A maximum water level 33 of tree-receiving reservoir 19 should be such that water 23 will not accidentally overflow wall 29 and onto a floor 22 surface around tree stand 21. An annular collar 34 of tree stand 21 can grip trunk 27 to hold tree 11 upright. Wall 29 and collar 34 provide support structure for holding tree 11 in an upright orientation. In the examples, automatic watering system 10 is useful to keep tree-receiving reservoir 19 sufficiently full with standing water 23 to keep tree 11 hydrated for extended time periods.

Supply-water reservoir 15 may be thought of as a first reservoir and tree-receiving reservoir 19 may be thought of as a second reservoir in the examples. Tree-receiving reservoir 19 may also be thought of as a standing-water reservoir as water 23 in tree-receiving reservoir 19 is standing water available for uptake by trunk 27 of cut tree 11 which is located in tree-receiving reservoir 19 of tree stand 21 in the examples.

Referring to FIGS. 1-10, tank 13 may include side walls 35, 37, end walls 39, 41 and bottom wall 43 and a top wall 45 to define a three-dimensional container and supply-water reservoir 15. Side walls 35, 37, end walls 39, 41 and bottom wall 43 are preferably a single unit. In certain embodiments, top wall 45 may be a removable lid. In certain other embodiments, top wall 45 may be designed so that it is not easily removable, for example by attachment to end walls 39, 41 by snaps 47, 49. In such embodiments, a sealing gasket 51 may be provided between top wall 45 and side 35, 37 and end walls 39, 41 to form a water-tight seal therebetween.

Tank 13 may have any shape including, but not limited to, the rectangular configuration illustrated in FIGS. 2-10. Other tank 13 configurations may include a cube shape, a cuboid shape, and a cylindrical shape.

Tank 13 may include a water-receiving opening 53 through which a user may add water to tank 13 supply-water reservoir 15. In those embodiments in which top wall 45 may be a removable lid, the water-receiving opening 53 may be the open top of the tank 13 defined by side and end walls 35-41. In other embodiments and as illustrated in FIGS. 2-10, water-receiving opening 53 may be a port in top wall 45. A twist on/off removable cap 55 with an O-ring seal 57 may be provided as a closure for water-receiving opening 53. A user can easily remove cap 55 to add water to tank 13 through opening 53. Tank 13 may be of any suitable material. Plastic material is desirable for use in making tank 13 for reasons of low cost and simplicity of manufacture because such materials enable tank 13 to be made by plastic injection molding as an example. Plastic material, such as Acrylonitrile Butadiene Styrene (ABS), may be used for manufacture of tank 13 as an example.

In certain embodiments, it may be desirable to include gift package structure to provide tank 13 with the decorative appearance of a gift package (i.e., a present) so that tank 13 resembles other gift packages 61, 63, 65, 67 under tree 11 as is traditional for the Christmas holiday. Disguising tank 13 as a decorative gift package may be particularly desirable to provide an ambiance consistent with holiday décor, of which tree 11 is typically a focal point.

Figure 4:
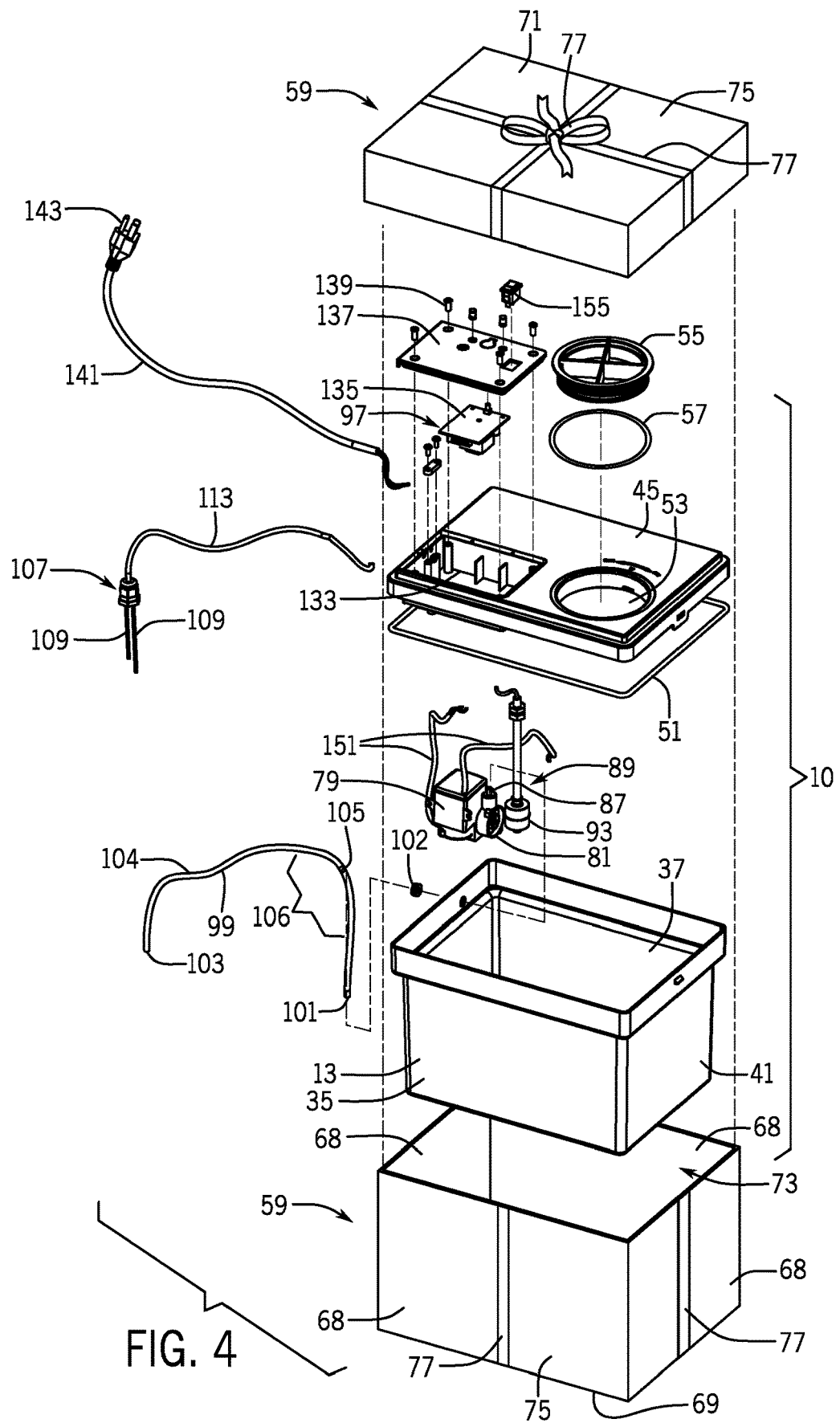
FIG. 4 is an exploded view of the automatic watering system of FIG. 1.
Figure 5:
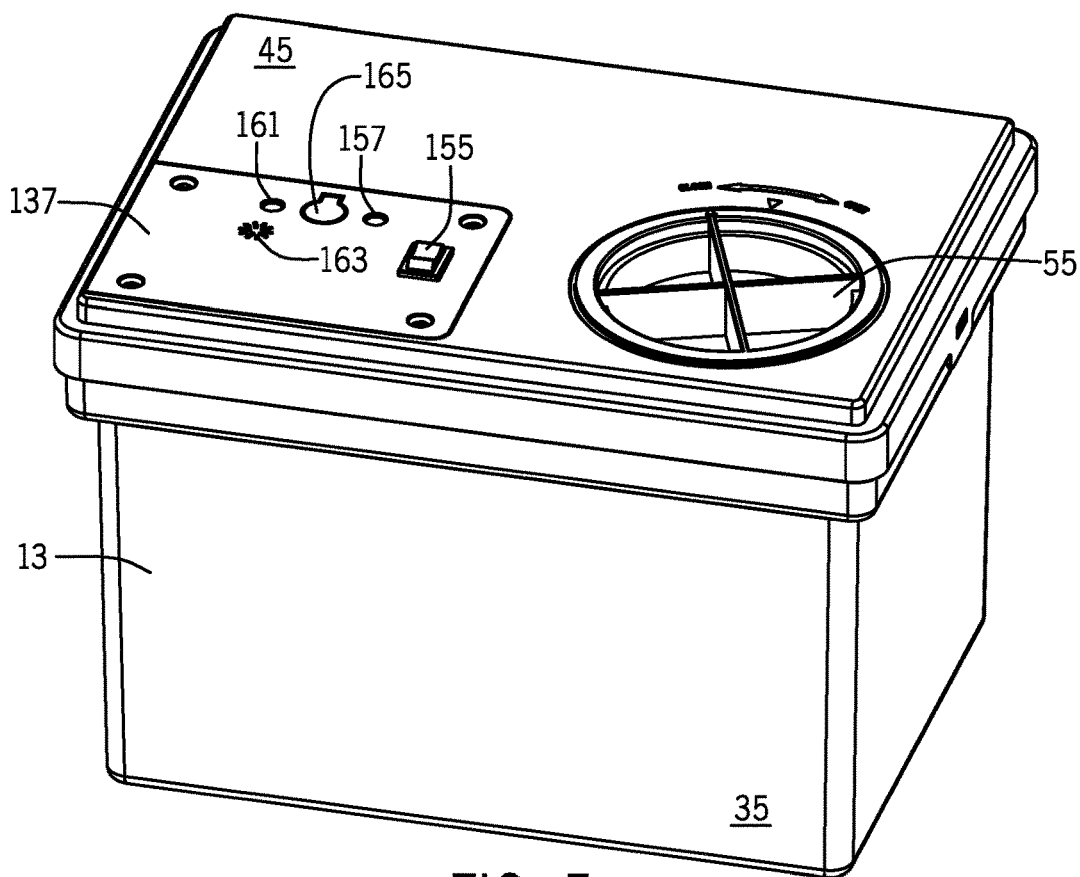
FIG. 5 is a perspective view of the tank of FIG. 2.
Figure 6:
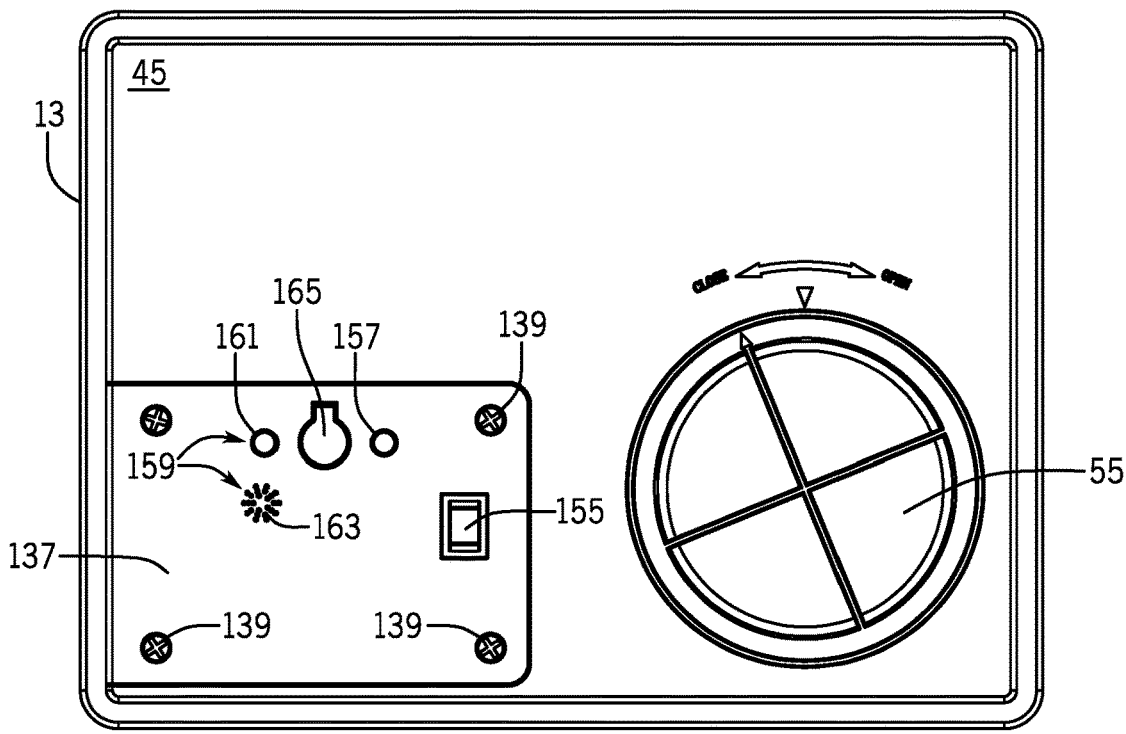
FIG. 6 is a top plan view of the tank of FIG. 2.
Figure 7:
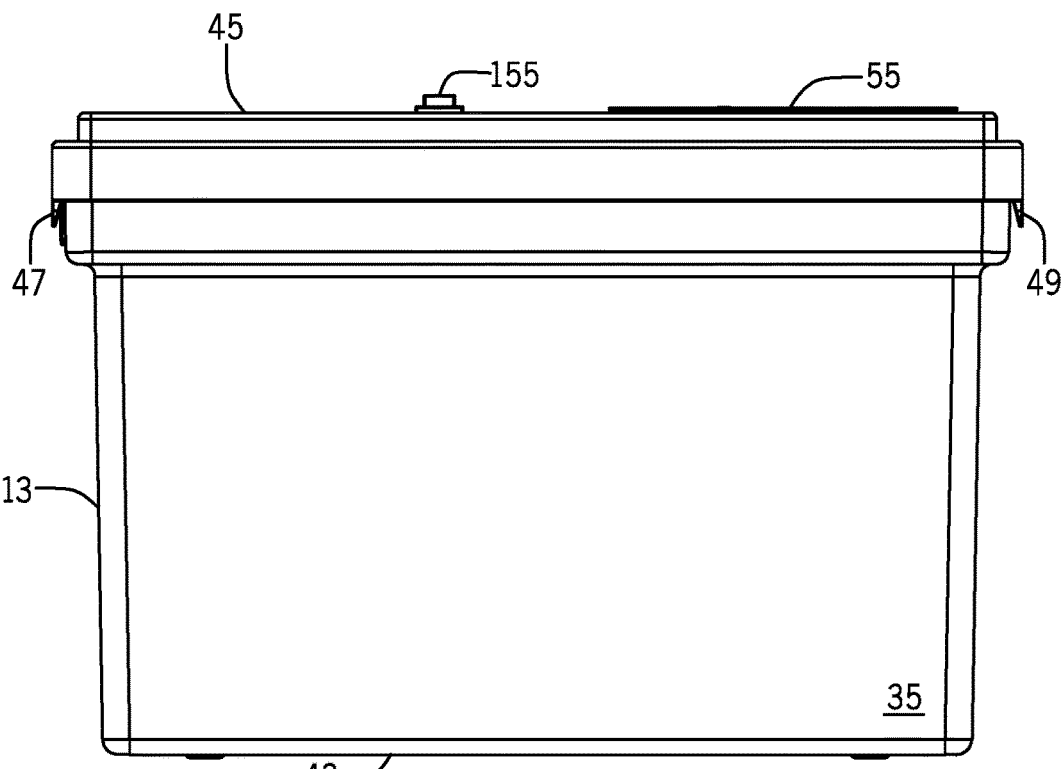
FIG. 7 is a first side elevation view of the tank of FIG. 2.
Figure 8:
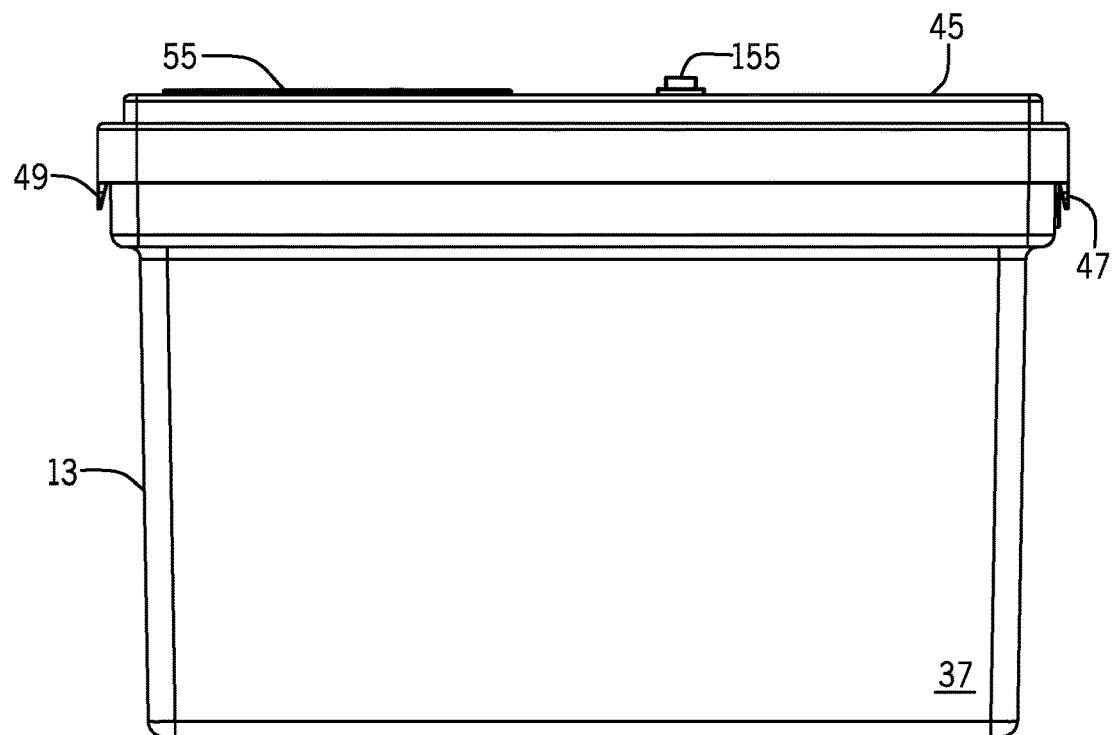
FIG. 8 is an opposite side elevation view of the tank of FIG. 2.
Figure 9:
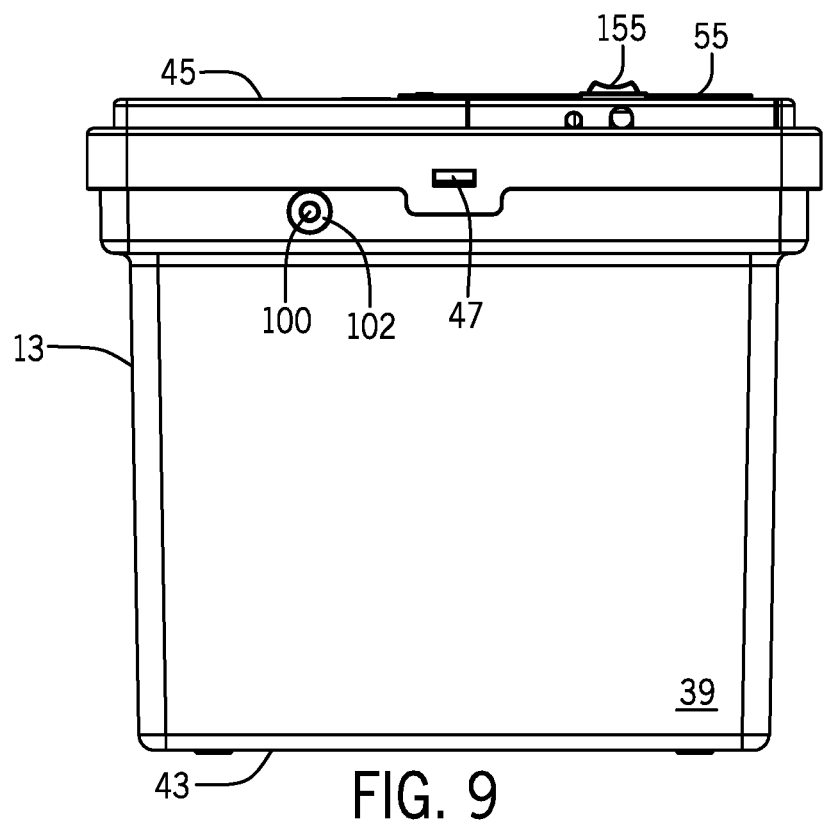
FIG. 9 is a first end elevation view of the tank of FIG. 2.
Figure 10:
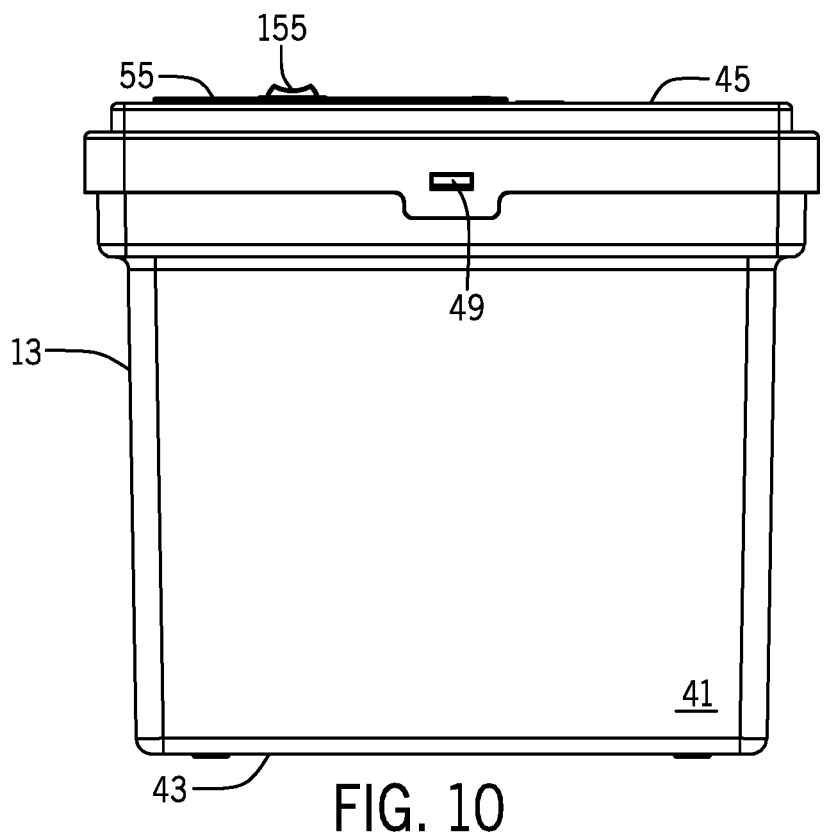
FIG. 10 is an opposite end elevation view of the tank of FIG. 2.

For example and as illustrated in FIGS. 1 and 4, gift package structure may comprise an enclosure 59 to surround and enclose tank 13 and to disguise tank 13 as a gift package and to provide the tank with the appearance of a gift package during use of automatic watering system 10.

Enclosure 59 may be a box with side walls (each identified by reference number 68), bottom wall 69, and lid 71 defining a space 73 within enclosure 59 to receive tank 13 therein. In embodiments, walls 68, 69 and lid 71 may be adorned with any sort of graphic indicia, including decorative graphic indicia simulating gift wrapping 75 (white color wrapping illustrated) and/or or a ribbon 77, and/or a bow (not shown). Such decorative indicia (e.g., wrapping 75 and/or ribbon 77, and/or a bow) may be in any desired color, pattern, or design to provide enclosure 59 with the decorative appearance of a gift package and so that tank 13 is fully or partially hidden from view.

In other embodiments, gift package structure may comprise decorative sheet material such as wrapping paper, film, or other sheet material, a ribbon or ribbons, a bow or bows, and/or other decorations applied manually over and around tank 13 alone (i.e., without enclosure 59), or applied manually over and around enclosure 59 (i.e., if tank is to be within space 73). Such gift package structure of decorative sheet material such as wrapping paper, film, or sheet material, a ribbon or ribbons, a bow or bows, and/or other decorations provide tank 13 or enclosure 59 with the decorative appearance of a gift package. Once again, the reason for providing the decorative appearance of a gift package is so that tank 13 blends in with, and does not detract from, tree 11 and other gift packages and decor which may be placed under, around, or nearby tree 11, as is typically done for example at the Christmas holiday.

Figure 3:
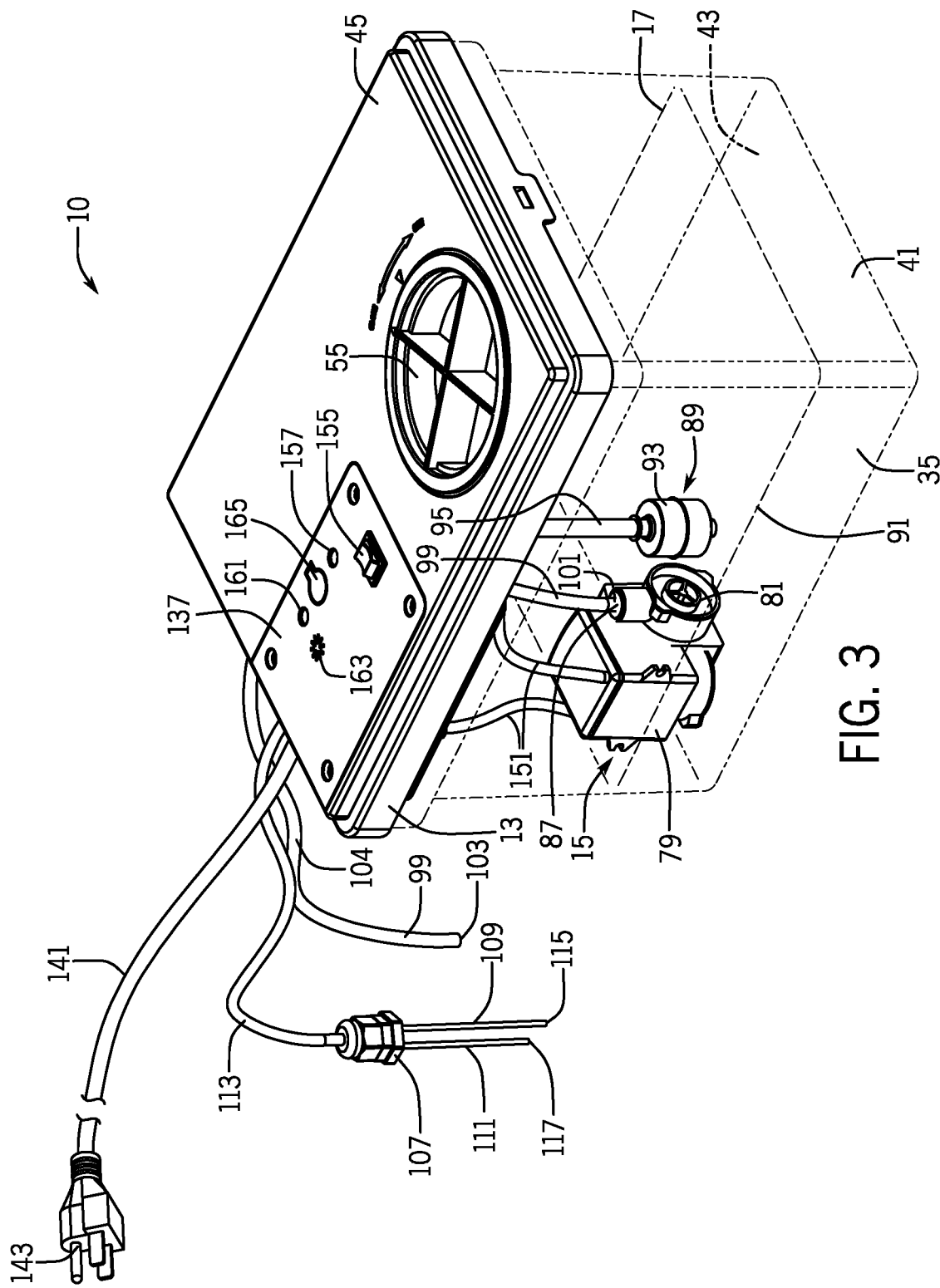
FIG. 3 is a perspective view of the watering system of FIG. 1 with certain components in phantom line.
Figure 12:
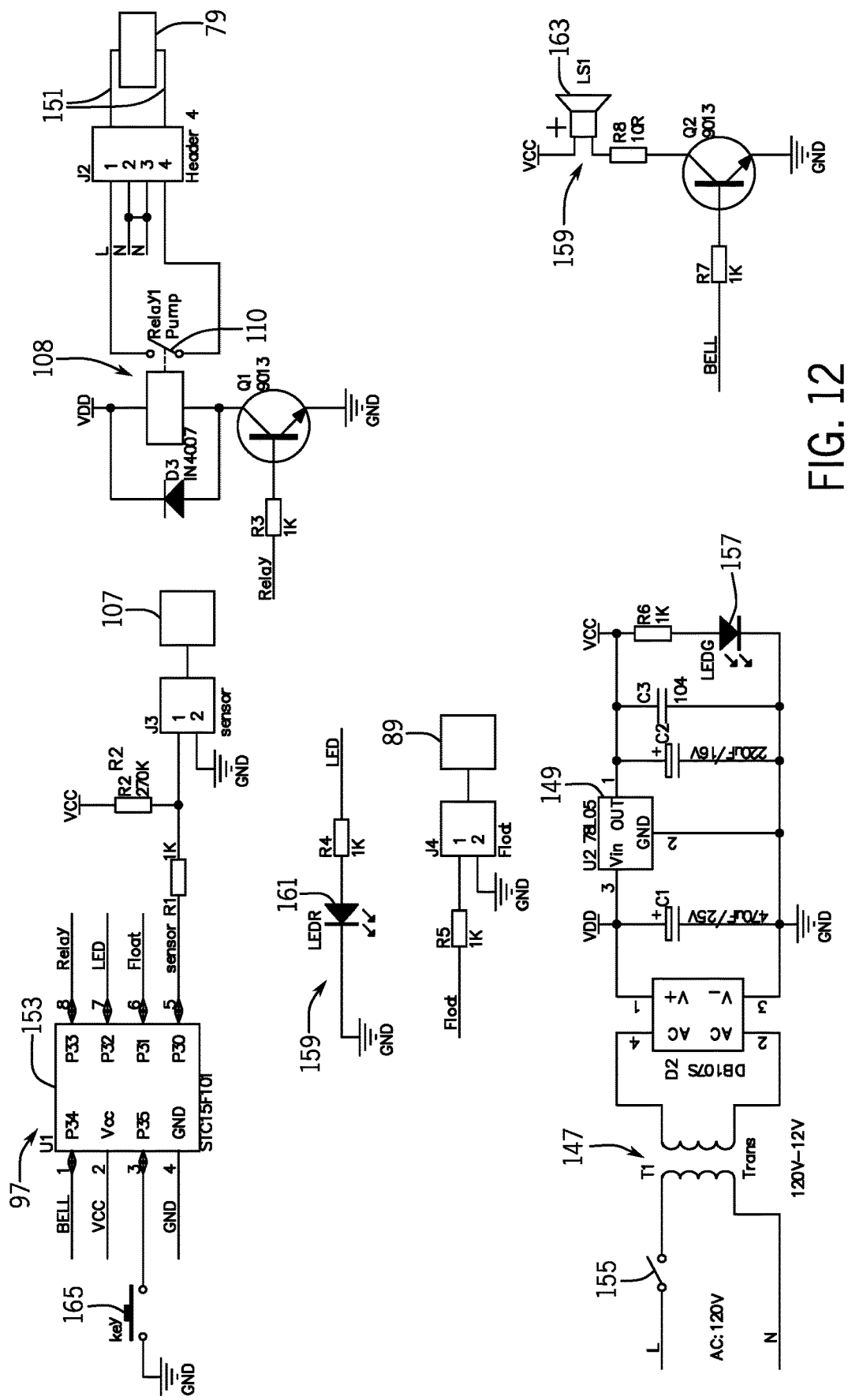
FIG. 12 is a schematic circuit diagram of components of the automatic watering system of FIG. 1.

Referring to FIGS. 3-4 and 12, an electric motorized water pump 79 may be provided to pump water 17 from tank 13 supply-water reservoir 15 to tree-receiving reservoir 19. Pump 79 may be a 12V DC motorized pump secured within tank 13 proximate bottom wall 43. Pump 79 may have a motor-driven impeller (not shown) and a water intake 81. Intake 81 is preferably located as close to bottom wall 43 as possible to maximize volumetric space in tank 13 for usable water 17 since intake 81 needs to be below the water level to avoid induction of air into pump 79. Pump 79 may further have a pressurized water outlet 87.

Referring further to FIGS. 3-4 and 12, a first water-level sensor 89 may be provided to detect that water 17 in supply-water reservoir 15 is at or above a minimum water level 91 in tank 13. First water-level sensor 89 may be within tank 13 and supply-water reservoir 15 or otherwise associated with tank 13. Minimum water level 91 may represent a minimum useful level of water 17 in tank 13 and supply-water reservoir 15 and intake 81 should be below minimum water level 91. Detection by first water-level sensor 89 that water 17 is above minimum water level 91 (or at any other level above minimum water level 91) may be used by controller 97 to enable pump 79 operation and, conversely to disable pump 79 operation when water 17 is below minimum water level 91, thereby preventing induction of air into pump 79 and potentially damaging pump 79. In embodiments, information on the water 17 level in tank 13 (e.g., water levels such as: full, ¾ full, ½ full, ¼ full, etc.) may be used by controller 97 to activate an alarm as described below or to provide information about the amount of water remaining in tank 13.

First water-level sensor 89 may be a float switch. A float switch is a type of level sensor used to detect the level of water 17 within tank 13. A float-type switch may include a float 93 which is buoyant in water 17 mounted for axial up or down movement on guide shaft 95. Float 93 may be connected to a switch (not shown) such as a reed switch in communication with system controller 97 through appropriate circuitry. Operation of the switch may provide information to controller 97 used to enable or disable pump 79. In the examples, when float 93 is above the switch, controller 97 may enable pump 79 operation. When float 93 moves down as water 17 within tank 13 is depleted to a position at the minimum water level 91, float 93 may move into contact with the switch and that contact may be used by controller 97 to disable pump 79 operation. While a float switch is described for use as first water-level sensor 89, it should be understood that other types of level sensors could be used for first water-level sensor 89 including, for example, ultrasonic level sensors.

Referring now to FIGS. 1-10, a water-delivery conduit 99 may be provided to conduct water 17 from tank 13 supply-water reservoir 15 to tree-receiving reservoir 19 which may be in tree stand 21. Conduit 99 may include a first end 101 in communication with pump water outlet 87 and a second end 103 for communication with tree-receiving reservoir 19. Conduit 99 may be a flexible elongate tube 104. Implementation of a flexible tube 104 has the advantage of allowing the user to easily lead tube 104 from tank 13 under tree 11 branches 25, around any obstacles, to tree stand 21 and to a position where second end 103 is in water-delivery communication with tree-receiving reservoir 19. Tube 104 may exit tank 13 through opening 100 in tank end wall 39 secured thereto by waterproof pliant gasket 102.

As illustrated in FIG. 4, conduit 99 may include structure purposed to stop any water-siphon effect which could cause water 17 from tank 13 to continue to flow through conduit 99 after pump 79 is stopped. Any such water-siphon effect could cause overflow of water 23 from tree-receiving reservoir 19. Water 23 overflow from tree-receiving reservoir 19 is undesirable because such water could damage the floor 22 underneath tree stand 21 and could damage any other thing in the path of the water. In the examples, vent 105 is the structure which stops any water-siphon effect. If provided, vent 105 may be at a section 106 of tube 104 or conduit 99 within tank 13 above a maximum water 17 level. Vent 105 may be a hole in section 106. Vent 105 may be sized to be as small as necessary to allow ambient air to pass into such tube 104 or conduit 99 when pump 79 is not operating. Entry of ambient air into vent 105 and conduit 99 breaks water tension necessary for the water-siphon effect and thereby stops water-siphon-type water movement once pump 79 is not operating to move water. When pump 79 is operating to move water, a small amount of water 17 may leak out from vent 105 but, because vent 105 is within conduit section 106, such water 17 will remain within tank 13 and supply-water reservoir 15.

Continuing with reference to FIGS. 1-4 and 12, a second water-level sensor 107 may be provided. Second water-level sensor 107 may be fully or partially within tree-receiving reservoir 19 defined by wall 29 or otherwise associated with tree-receiving reservoir 19. In the examples, second water-level sensor 107 can detect when standing water 23 in tree-receiving reservoir 19 is below and at a maximum water level 33. It is desirable that water in tree-receiving reservoir be at maximum water level 33 and that trunk 27 end is minimally below low water level 31. Of course, evaporation and/or water uptake by tree 11 will cause water 23 in tree-receiving reservoir to become depleted resulting in loss of hydration if more water is not added. With pump 79 enabled for operation, detection by second water-level sensor 107 that water 23 is below the maximum water level 33 (FIG. 2) may be used to trigger pump 79 operation to cause water 23 in tank 13 to be delivered (i.e., pumped) to tree-receiving reservoir 19 while detection by second water-level sensor 107 that water 23 is at maximum water level 33 may be used to stop pump 79 operation to avoid overfilling tree-receiving reservoir 19. Pump 79 may be turned "on" or "off" by means of a relay 108 and switch 110 (FIG. 12).

Second water-level sensor 107 may be a conductive sensor with a pair of conductive sensor probes 109, 111. In the example, probe 109 may be longer than probe 111. Probes 109, 111 may be connected to controller 97 through a cable 113 or other suitable connection (e.g., a wireless connection). Conductive sensor 107 may generate a signal triggered by water contact with neither probe 109, 111, by just longer probe 109, and by water contact with both longer and shorter probes 109, 111. In the examples, a low water level state in tree-receiving reservoir 19 exists below distal end 117 of shorter probe 109 while maximum water level 33 in tree-receiving reservoir 19 exists at distal end 117 of shorter probe 111.

In the examples of FIGS. 1-10 and 12, when water 23 in tree-receiving reservoir 19 is below distal end 117 of shorter probe 111 that state is used to indicate that tree-receiving reservoir 19 is not full and to generate a signal to controller 97 which in turn energizes relay 108 to close switch 110 to turn pump 79 "on" to deliver water 17 to tree-receiving reservoir 19. When water 23 in tree-receiving reservoir 19 is in contact with both longer probe 109 and distal end 117 of shorter probe 111, that state is used to indicate that tree-receiving reservoir is full and to generate a signal to controller 97 which in turn de-energizes relay 108 opening switch 110 turning pump 79 "off" and stopping further delivery of water to tree-receiving reservoir 19.

Figure 11:
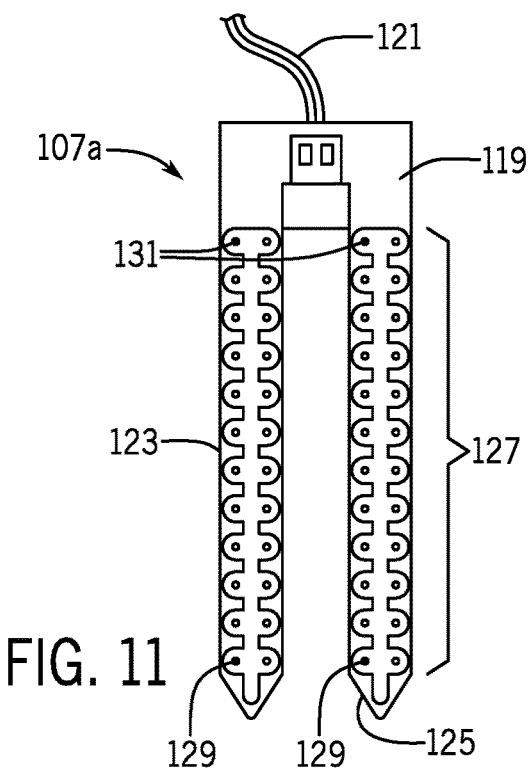
FIG. 11 is a further embodiment of a second water-level sensor.

Referring now to FIG. 11, there is shown a further embodiment of a second water-level sensor 107a which may be used in place of second water-level sensor 107. Second water-level sensor 107a may be a conductive water sensor and may include a circuit board 119 operatively connected to controller 97 through a cable 121 or other suitable connection (e.g., a wireless connection). Circuit board 119 may include a pair of probes 123, 125. In the examples, a ladder 127 of parallel electrically-conductive contact pairs may be provided on probes 123, 125. For convenience and brevity, just minimum water level contact pair 129 (level 1) and maximum water level contact pair 131 (level 12) are indicated with reference numbers, it being understood that the contact pairs on probes 123, 125 between minimum and maximum contact pairs 129, 131 (levels 2-11) can provide information about water level in tree-receiving reservoir 19 to controller 97.

In the example of FIG. 11, when water 23 in tree-receiving reservoir 19 is below maximum contact pair 131, that state may be used to generate a signal to controller 97 calling for delivery of water 17 to tree-receiving reservoir 19 and controller can energize relay 108 to close switch 110 to turn pump 79 "on". When water 23 in tree-receiving reservoir 19 is in contact with both minimum contact pair 129 and is across maximum contact pair 131, that state is used to generate a signal to controller 97 which in turn de-energizes relay 108 to open switch 110 turning pump 79 "off" stopping further delivery of water to tree-receiving reservoir 19. A level of water 23 forming a moisture bridge across contact pairs on any one step of the ladder 127 (e.g., contact pairs 129, 131), or the lack of such a water level 23, may send a signal to controller 97 that can be used to determine the water level in tree-receiving reservoir 19 (e.g., water levels such as: full, ¾ full, ½ full, ¼ full, etc.).

While a conductive type sensor is described for use as second water-level sensor 107 and 107a, it should be understood that other types of level sensors could be used for second water-level sensor 107. For example, an ultrasonic level sensor could be implemented.

Referring to FIGS. 1-10 and 12, controller 97 and examples of controls and features of watering system 10 will next be described. Top wall 45 of tank 13 may include a water-tight enclosure 133 for circuit board 135 on which controller 97 and components of FIG. 12 may be mounted. Enclosure 133 may be covered by a water-tight access panel 137 preventing water from contacting and damaging circuit board 135 and controller 97. Access panel 137 may be secured over enclosure 133 by four screw-type fasteners (all indicated by reference number 139). Electrical power cable 141 with a conventional grounded plug 143 may be provided to supply electrical current to controller 97 and automatic watering system 10 from, for example, a 110V or 120V wall power outlet 145. A transformer 147 (FIG. 12) steps power down to 12V and a power regulator 149 may further reduce power to 5V to power controller 97 and related components. Controller 97 may be connected to pump 79 through cables 151 which form a circuit including relay 108 and switch 110 to supply electrical power to pump 79 in tank 13 for purposes of starting, operating, and stopping pump 79 by means of controller 97.

Controller 97 may be any sort of data processing platform and may include, for example, a microcontroller 153, non-volatile memory onboard microcontroller 153, and interface circuitry (wired, wireless, etc.) for operative connection with pump, 79, first and second water-level sensors 89, 107, on/off rocker switch 155, power on indicator 157 which may be a light emitting diode (LED), and alarm 159 to control operation of automatic watering system 10. A wide variety of microcontroller chips are available to be used with automatic watering system 10. In the example of FIG. 12, microcontroller 153 designated as U1 may be a semiconductor chip STC15F101, and one such chip is available from Shenzhen Chipskey Technology Co. Ltd. through Alilbaba-.com.

Controller 97 microcontroller 153 may include logic provided to alternate operation between active and inactive (i.e., sleep) modes. During active modes, controller 97 may be operative to detect water levels in supply-water reservoir 15 and tree-receiving reservoir 19 and to operate pump 79 accordingly. Sleep modes may be of any desired duration, such as 1, 2, or any number of minutes or hours.

If an enclosure 59 is provided for tank 13, then appropriate organized openings (not shown) may be provided in enclosure 59 to allow conduit 99, second water sensor 107 or 107a and power cable 141 to pass through enclosure 59 to provide an organized an inconspicuous appearance to enclosure 59 consistent with the appearance of a gift package. Other openings or access panels (not shown) may be provided in enclosure 59 lid 71 to allow for user access to on/off rocker switch 155 and to allow a user to view alarm 159.

On/off rocker switch 155 may be provided to power on and power off controller 97 and automatic watering system 10 to thereby activate or deactivate automatic watering system.

Alarm 159 may be provided to alert a user of any error state, for example that tank 13 supply-water reservoir 15 water 17 is partially depleted or at minimum level 91 and requires replenishment as indicated by first water-level sensor 89. Alarm 159 may be any suitable device used to provide information to a user including light alarms, audible alarms, and combinations of light and audible alarms. Alarm 159 of a light alarm type 161 may be a light emitting diode (LED) or other light emitter. Controller 97 may, for example, blink LED of light alarm 159 to indicate that water 17 in tank 13 is partially depleted and could operate LED 161 in a steady on state when the water 17 falls to the minimum level 91 in tank 13 as detected by float 93 movement and switch closure. Alarm 159 may also be an audible alarm which emits an audible sound from a speaker 163. Controller 97 may, for example, intermittently operate the audible sound emitted from speaker 163 to indicate that water 17 in tank 13 is partially depleted and could operate the sound emitted from speaker 163 in a steady on state when the water 17 falls to the minimum level 91 in tank 13. The sound emitted from speaker 163 could be any type of sound, including a single tone or music such as a Christmas carol. A push button switch 165 may be provided to allow the user to switch between LED 161 alarm and audible alarm from speaker 163 or to simultaneously implement both LED 161 alarm and the audible alarm emitted from speaker 163.

Operation

Referring now to FIGS. 1-10 and 12, operation of exemplary automatic watering system 10 to hydrate a cut tree 11 held upright in a tree stand 21 with trunk 27 in tree-receiving reservoir 19 may be as follows. Tank 13 may initially be placed in enclosure 59 with conduit 99, second water sensor 107 cable 113, and power cable 141 passing through one or more opening (not shown) in enclosure 59. Tank 13 cap 55 may be removed by a user and water 17 poured into tank 13 supply-water reservoir 15 through water-receiving opening 53 (i.e., port) in top wall 45 of tank 13 before or after tank 13 is placed into enclosure 59.

Next, the user may position second water-level sensor 107 probes 109, 111 vertically upright within tree-receiving reservoir 19. If desired, probes 109, 111 may be held vertically upright against wall 29 defining tree-receiving reservoir 19 by a Velcro strap 167 or other appropriate fastener. In the examples, distal end 117 of probe 111 representing maximum water level 33 should be in tree-receiving reservoir 19 below wall 29 to ensure water does not overflow tree-receiving reservoir and onto floor 22. Distal end 117 of probe 111 should also be in tree-receiving reservoir 19 above the bottommost end of the cut trunk 27 to ensure water 23 is in constant contact with trunk 27 for tree 11 hydration. If second water-level sensor 107a is implemented in place of sensor 107, then maximum contact pair 131 should be in tree-receiving reservoir 19 below wall 29 and above the bottommost end of cut tree trunk 107.

Before or after second water-level sensor 107 (or sensor 107a) is secured within tree-receiving reservoir 19, the user will secure second end 103 of conduit 99 to tree stand 21 in position to deliver water into tree-receiving reservoir 19. A clip, a Velcro strap (not shown) or other appropriate securing device may be used to secure conduit 99 to tree stand 21. As previously described, conduit 99 may be an elongate flexible tube 104 which has the advantage of being easy to lead under branches 25 of tree 11 and around any other obstacles, such as gift packages 61-67 which may be under tree 11.

Next, and with plug 143 in an appropriate electrical power receptacle (e.g., a wall socket 145 or extension cord), the user toggles switch 155 to the "on" position to activate automatic watering system 10 causing power indicator 157 to activate in a steady "on" state to indicate to the user that the system 10 is operative. The user may then place lid 71 on enclosure 59. Implementation of optional decorative wrapping 75 and ribbon graphics 77 may help to disguise tank 13 as a gift package and make tank 13 blend in with other gift packages 61-67 that may be under tree 11, then or in the future.

Once powered, controller 97 operatively connected to first water-level sensor 89 detects whether the water level 17 in the supply-water reservoir 15 of tank 13 is above the minimum water level 91. If float 93 is above minimum water level 91, then controller 97 enables pump 79 for operation.

Controller 97 operatively connected to second water-level sensor 107, also detects whether the level of standing water 23 in the tree-receiving reservoir 19 is below or at maximum water level 33. In the example, lack of water contact with both probe 109 and probe 111, would be interpreted by controller 97 as meaning the tree-receiving reservoir 19 is not full and that more water 23 is needed. A water 23 level to and including probe 109 and distal end 117 of probe 111 would be interpreted by controller 97 as meaning tree-receiving reservoir 19 is full of water 23 and that additional water 23 is not needed. In the example of second water-level sensor 107a, lack of water contact with maximum contact pair 131 would be interpreted by controller 97 as meaning the tree-receiving reservoir 19 is not full and that more water 23 is needed while a water bridge formed between maximum contact pair 131 would indicate that no further water is needed.

Therefore, if pump 79 is enabled and water 23 in tree-receiving reservoir 19 is below distal end 117 of probe 111 (or maximum contact pair 131), then controller 97 will turn pump 79 "on" to deliver (i.e., pump) water from tank 13 through conduit 99 and into tree-receiving reservoir 19 until water touches both probe 109 and distal end 117 of short probe 111 (or maximum contact pair 131) representing the maximum water level 33. Controller 97 may then turn pump 79 "off" and go into a sleep mode for any desired time interval.

In the examples, controller 97 may exit sleep mode at certain time intervals, such as once every two hours or any other desired interval. Controller 97 may then repeat the above-described process, first determining whether the water level 17 in the supply-water reservoir 15 of tank 13 is above the minimum water level 91 and then whether the level of standing water 23 in tree-receiving reservoir 19 is below the maximum water level 33. Controller 97 can leave pump 79 "off" if standing water 23 in tree-receiving reservoir 19 is at the maximum water level 33 or turn pump 79 "on" if more water 23 is needed to fill tree-receiving reservoir 19 to the maximum level 33.

If vent 105 is provided in conduit 99, then ambient air may enter conduit 99 after pump 79 is stopped. Air entry into conduit 99 breaks any water tension that would enable water 17 to continue flowing through conduit 99 by means of water-siphon effect, potentially causing water to overflow tree-receiving reservoir 19 and onto the floor around tree 11.

The foregoing process is repeated until water 17 in supply-water reservoir 15 of tank 13 is depleted, or until automatic watering system 10 is turned "off" using rocker switch 155.

Automatic watering systems 10 of the types described herein can be configured to provide one or more advantages. One advantage is that the automatic watering system 10 operates automatically without a user having to first notice that the tree-receiving reservoir 19 water 23 is low. Another advantage is that the tree-receiving reservoir 19 is replenished automatically, providing continuous tree hydration and avoiding any need for the user to manually stoop or crawl under the tree branches 25 to manually pour water into the tree-receiving reservoir 19. Instead, the user can easily replenish water in tank 13 supply-water reservoir 15 which may be at a convenient location to a side of tree 11. Automatic watering system 10 can also lessen the frequency of water replenishment because tank 13 supply-water reservoir 15 provides a water source in addition to that of tree-receiving reservoir 19 and tank 13 supply-water reservoir 15 can be volumetrically oversized relative to tree-receiving reservoir 19. Further, automatic watering system 10 can be configured to alert the user when water in tank 13 supply-water reservoir 15 requires replenishment to ensure that tree 11 remains hydrated.

Automatic watering system 10 can achieve these and other advantages while providing the opportunity to provide tank 13 and many system components with the appearance of an attractive gift package by means of a decorative enclosure 59 adorned with wrapping paper 75 and/or ribbon 71 indicia or even by physically wrapping tank 13 or enclosure 59 with decorative sheet material such as wrapping paper and ribbons or bows. So adorned, automatic watering system 10 blends in with, and can actually enhance, the appearance of tree 11, gift packages 61-67 under tree 11, and any other adjacent décor while continuously providing hydration for the tree 11.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. The disclosed automatic watering system 10 may address some or all of the problems previously described. A particular embodiment need not address all of the problems described, and the claimed automatic watering system 10 should not be limited to embodiments comprising solutions to all of these problems. Further, several advantages have been described that flow from the structure and methods; the present invention is not limited to structure and methods that encompass any or all of these advantages. Those skilled in the relevant art, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein.

What is claimed is:

1. An automatic tree-watering system for hydrating a cut tree from a tree-receiving reservoir in which standing water can be received, the watering system comprising:
   a tank defining a supply-water reservoir;
   gift package structure providing the tank with the appearance of a gift package;
   a pump having a water inlet in communication with the supply-water reservoir of the tank and a water outlet;
   a first water-level sensor associated with the tank operative to detect that water in the supply-water reservoir is above a minimum water level;
   a water-delivery conduit having a first end in communication with the pump water outlet and a second end for communication with the tree-receiving reservoir;
   a second water-level sensor for association with the tree-receiving reservoir operative to detect that water in the tree-receiving reservoir is below a maximum water level, the second water-level sensor being a conductive sensor having a pair of conductive probes with one probe being longer than the other and the shorter probe defining the location of the maximum water level, wherein water contact with both the shorter and longer probes indicates to a controller that the tree-receiving reservoir is full of water while water contact with the longer probe but not the shorter probe indicates to the controller that the tree-receiving reservoir requires additional water; and
   the controller is operatively connected to the first and second water-level sensors and pump which enables pump operation when the first water-level sensor detects that water in the supply-water reservoir of the tank is above the minimum water level and, when the pump is enabled, the controller immediately starts and continuously runs the pump when standing water in the tree-receiving reservoir falls below the shorter probe defining the maximum water level and stops the pump when standing water in the tree-receiving reservoir has risen into contact with the shorter probe at the maximum water level, to thereby supply standing water to the tree-receiving reservoir for the cut tree hydration while limiting water level fluctuation and also preventing overflow of the tree-receiving reservoir.

2. The automatic tree-watering system of claim 1 wherein the gift package structure includes an enclosure around the tank and the enclosure includes indicia providing the appearance of the gift package.

3. The automatic tree-watering system of claim 2 wherein the indicia providing the appearance of the gift package are selected from the group consisting of the appearance of gift wrapping, a ribbon, and combinations thereof.

4. The automatic tree-watering system of claim 1 wherein the gift package structure is selected from the group consisting of decorative sheet material, a ribbon, a bow, and combinations thereof.

5. The automatic tree-watering system of claim 1 wherein the tree-receiving reservoir is associated with a tree stand.

6. The automatic tree-watering system of claim 1 wherein the tank is a three-dimensional container with walls defining a rectangular configuration.

7. The automatic tree-watering system of claim 1 wherein the tank is a three-dimensional container further defining a water-receiving opening.

8. The automatic tree-watering system of claim 7 wherein the water-receiving opening is a port in a top wall of the tank.

9. The automatic tree-watering system of claim 8 further including a removable cap covering the port.

10. The automatic tree-watering system of claim 7 wherein the pump is an electric pump and the pump is inside the tank.

11. The automatic tree-watering system of claim 10 wherein the first water-level sensor is a float switch.

12. The automatic tree-watering system of claim 10 further including an alarm operative to indicate that water in the supply-water reservoir of the tank is at the minimum water level.

13. The automatic tree-watering system of claim 12 wherein the alarm is selected from the group consisting of a light alarm, an audible alarm, and combinations thereof.

14. The automatic tree-watering system of claim 13 further including a switch enabling selection of the light alarm, the audible alarm, or both alarms.

15. The automatic tree-watering system of claim 10 wherein the conduit is a flexible elongate tube.

16. The automatic tree-watering system of claim 15 wherein the tube has a portion within the tank above the maximum water level and such tube portion defines a vent opening through which air can pass when the pump is not running to stop any water-siphon effect.

17. The automatic tree-watering system of claim 10 further including an on-off switch for activating, and alternatively, deactivating the system.

* * * * *